United States Patent
Dunn (10) Patent No.: US 11,519,522 B1
(45) Date of Patent: Dec. 6, 2022

(54) LIVE LOAD PACKING INJECTION APPARATUS AND METHOD FOR VALVES

(71) Applicant: J-S MACHINE & VALVE, INC., Nowata, OK (US)

(72) Inventor: Brian M. Dunn, Nowata, OK (US)

(73) Assignee: J-S MACHINE & VALVE, INC., Nowata, OK (US)

( * ) Notice: Subject to any disclaimer, the term of this patent is extended or adjusted under 35 U.S.C. 154(b) by 0 days.

(21) Appl. No.: 17/375,502

(22) Filed: Jul. 14, 2021

(51) Int. Cl.
*F16K 41/00* (2006.01)
*F16N 11/04* (2006.01)

(52) U.S. Cl.
CPC ............ *F16K 41/003* (2013.01); *F16N 11/04* (2013.01)

(58) Field of Classification Search
CPC ...... F16K 41/003; F16K 41/006; F16K 41/02; F16N 7/14; F16N 3/00; F16N 3/02; F16N 3/08; F16N 3/10; F16N 3/12; F16N 2037/006; F16N 21/04; F16N 11/04
See application file for complete search history.

(56) References Cited

U.S. PATENT DOCUMENTS

| | | | | |
|---|---|---|---|---|
| 2,307,346 A * | 1/1943 | Allen | ....................... | F16J 15/14 138/44 |
| 3,199,876 A * | 8/1965 | Magos | ................... | F16J 15/181 251/355 |
| 3,805,783 A * | 4/1974 | Ismach | ................... | A61M 5/30 604/71 |
| 4,295,653 A * | 10/1981 | Coles | ...................... | F16J 15/008 277/516 |
| 5,056,758 A * | 10/1991 | Bramblet | .............. | F16K 41/046 277/513 |
| 5,244,183 A * | 9/1993 | Calvin | ..................... | F16K 41/00 277/320 |
| 5,607,165 A * | 3/1997 | Bredemeyer | ......... | F16K 41/003 277/910 |
| 6,302,401 B1 * | 10/2001 | Palmour | ................ | F16J 15/182 277/513 |
| 10,738,897 B2 * | 8/2020 | Fick | ........................ | F16K 5/225 |
| 2011/0074115 A1 | 3/2011 | Cohen Zada Vaizman | | |

FOREIGN PATENT DOCUMENTS

| | | | |
|---|---|---|---|
| CN | 202220576 | 5/2012 | |
| CN | 204552678 | 8/2015 | |
| CN | 205577924 | 4/2016 | |
| CN | 206234457 | 6/2017 | |
| EP | 589138 A2 * | 3/1994 | ............. F16J 15/181 |
| EP | 0422342 | 12/1994 | |
| WO | 2012045995 | 4/2012 | |

\* cited by examiner

*Primary Examiner* — Mary E McManmon
*Assistant Examiner* — Andrew J Rost
(74) *Attorney, Agent, or Firm* — Dennis D. Brown; Brown Patent Law P.L.L.C.

(57) ABSTRACT

A live load stinger apparatus and method which operate to automatically deliver an additional amount of an injectable packing material or grease into the stem packing chamber of a valve assembly in order to prevent stem leaks from occurring.

14 Claims, 3 Drawing Sheets

LIVE LOAD PACKING INJECTION APPARATUS AND METHOD FOR VALVES

Field of the Invention

The present invention relates to apparatuses and methods for automatically injecting packing materials or grease into valves to prevent or stop valve stem leaks.

BACKGROUND OF THE INVENTION

The valves used for manually or automatically adjusting or controlling fluid flow in pipelines, refineries, chemical plants, and in other industrial applications will commonly be of a type which comprises: a valve body which contains a ball, gate, or other valve element; a bonnet which removably covers the valve body; a valve stem which extends through the bonnet to the valve element for opening, closing and adjusting the valve; and a stem packing chamber (also commonly referred to as a stuffing box) which is positioned within the bonnet and which surrounds the valve stem. The stem packing chamber is filled with a packing material and/or grease which assists in sealing, the stem channel within the bonnet to prevent stem leaks.

Many of these valves also include an injection fitting for delivering an injectable packing material or grease into the stem packing chamber using an injection gun. Examples of injectable packing Materials include, but are not limited to, injectable packing materials formed of Teflon, packing materials formed of other injectable plastics, and compositions comprising chopped and/or braided packing fibers of various sorts combined with greases and/or lubricants.

The injection fitting will typically include an internal ball check valve for preventing any backflow of the injectable packing material or grease out of the stem packing chamber. Alternatively, or in addition, the injection fitting can include a ball valve and a handle for opening and closing the injection fitting.

The injection fitting will also typically include at internally threaded passageway upstream of the check valve. The internally threaded, passageway receives the discharge connection of the injection gun when tilling the stem packing chamber with the injectable packing material or grease. Once the stem packing chamber is filled, the injection gun is disconnected and a "stinger" bolt or screw (also commonly referred to as a packing adjustment bolt or screw) is threadedly received in the threaded passageway. Initially, after the filling procedure is completed, the stinger does not extend, entirely into the internally threaded passageway. Rather, an inner portion of the passageway between the cheek valve and the forward end of the stinger is also filled with the packing material or grease.

Stem leaks can occur during start-ups or when making operational changes, Stem leaks can also occur as the packing material or grease in the stem packing chamber becomes worn or depleted. When a stem leak occurs, the threaded stinger is manually tightened as needed to push an additional amount of the injectable packing material or grease through the check valve of the injection fitting and into the stem packing chamber. The additional packing material or grease which is pushed into the stem packing chamber by the stinger fills and conforms to the packing chamber, increases the pressure therein, and reactivates any packing rings or other packing elements which. may also be positioned in the packing chamber.

Stem leaks produce undesirable fugitive emissions and losses which can be hazardous or costly. Stem leaks can also damage the packing material or the valve itself. Consequently, a need exists for an apparatus and method which will reduce or effectively eliminate stem leaks by automatically delivering an additional amount of injectable packing material or grease into the stem packing chamber, as needed before a leak occurs. Suety an apparatus and method will preferably be useful for new valves and for retrofitting existing valves, The apparatus will also preferably be installable without modifying the valve and without isolating the valve or taking the valve out of service. In addition, the apparatus will preferably not interfere with the injection of new packing material or grease and will allow the valve to be restored to its original condition and operation by simply removing the apparatus. Further, the apparatus will preferably inform the operator when the packing material or grease is depleted to the point that a refill is needed.

SUMMARY OF THE INVENTION

The present invention provides a live load stinger apparatus and method which satisfy the needs and alleviate the problems discussed above. The inventive stinger and method operate to automatically inject a packing material or grease into the stem packing chamber as needed to maintain a sufficient amount and pressure of the packing material or grease in the stem packing chamber to prevent leaks from occurring. The inventive live load stinger can be used in a new valve or can be installed in an existing valve without modifying the existing valve and without isolating the valve or taking the valve out of service. The inventive live load stinger apparatus and method preferably also provide a visual notification when a refill is needed. In addition, when the inventive live load stinger is removed, the valve injection fitting will be restored to its original condition so that a typical injection apparatus can be attached to the injection fitting and used to refill the stem packing chamber while the valve remains in operation.

In one aspect, there is provided a live load stinger apparatus for automatically delivering an injectable packing material or grease into a valve stem packing chamber. The live load stinger apparatus preferably comprises a body having (i) a longitudinal axis, (ii) a longitudinally extending piston chamber which surrounds the longitudinal axis, (iii) a plunger rod conduit which extends longitudinally forward from a forward longitudinal end of the piston chamber, and (iv) external threads provided around the plunger rod conduit. The live load stinger apparatus preferably also comprises: a piston which is positioned in the piston chamber; one of more biasing elements, Compressed air, and/or a compressed gas in the piston chamber which continuously urge the piston in a forward longitudinal direction; and a plunger comprising a plunger head which is provided on a forward longitudinal end of a plunger rod, the plunger head being positioned for longitudinal movement outside of forward longitudinal end of the plunger rod conduit. The plunger rod preferably either (a) extends longitudinally rearward through the plunger rod conduit and into the piston chamber so that the piston continuously urges the plunger in the forward longitudinal direction or (b) extends longitudinally rearward through a portion of the plunger rod conduit so that the plunger is continuously urged in the forward longitudinal direction by a piston shaft which extends forwardly from the piston into a rearward longitudinal end of the plunger rod conduit.

In another aspect, there is provided a valve assembly which preferably comprises: a valve stem; stem packing chamber which surrounds the valve stem; an injection fitting; and a live load stinger apparatus. The injection fitting preferably has (i) a forward discharge end which is in fluid communication with the stem packing chamber, (ii) a rearward end, and (iii) an internal check valve located between the rearward end and the forward discharge end of the injection fitting.

The live load stinger apparatus used in the valve assembly preferably comprises a body having (i) a longitudinal axis, (ii) a longitudinally extending piston chamber which surrounds the longitudinal axis, (iii) a plunger rod conduit which extends longitudinally forward from a forward longitudinal end of the piston chamber, and (iv) external threads provided around the plunger rod conduit, the plunger rod conduit being threadedly received in the rearward end of the injection fitting. The live load stinger apparatus of the valve assembly preferably also comprises: a piston which is positioned in the piston chamber; one or more biasing elements, compressed air, and/or a compressed gas in the piston chamber which continuously urge the piston in a forward longitudinal direction; and a plunger comprising a plunger head which is provided on a forward longitudinal end of a plunger rod, the plunger head being positioned for longitudinal movement in the injection fitting in a space within the injection fitting between a forward longitudinal end of the plunger rod conduit and the internal check valve. The plunger rod preferably either (a) extends longitudinally rearward through the plunger rod conduit and into the piston chamber so that the piston continuously urges the plunger in the forward longitudinal direction or (b) extends longitudinally rearward through a portion of the plunger rod conduit so that the plunger is continuously urged in the forward longitudinal direction by a forward piston shaft which extends forwardly from the piston into a rearward longitudinal end of the plunger rod conduit. In addition, the valve assembly preferably further comprises an injectable packing material or grease which is provided in the stem packing chamber and is provided between the plunger head and the internal check valve in the space within the injection fitting.

In another aspect, there is provided a method of retrofitting a valve assembly having a valve stem, a stem packing chamber which surrounds the valve stem, and an injection fitting having a forward discharge end, an internal check valve, and a stinger bolt or screw which is threadedly received in a rearward end of the injection fitting. The method preferably comprises the steps of: (a) removing the stinger bolt or screw from the injection fitting and (b) replacing the stinger bolt or screw with a live load stinger apparatus.

The live load stinger apparatus used in the method preferably comprises a body having (i) a longitudinal axis, (ii) a longitudinally extending piston chamber which surrounds the longitudinal axis, (iii) a plunger rod conduit which extends longitudinally forward from a forward longitudinal end of the piston chamber, and (iv) external threads provided around the plunger rod conduit. The live load stinger apparatus preferably also comprises: a piston which is positioned in the piston chamber; one or more biasing elements, compressed air, and/or a compressed gas in the piston chamber which continuously urge the piston in a forward longitudinal direction; and a plunger comprising a plunger head which is provided on a forward longitudinal end of a plunger rod. The plunger rod preferably either (a) extends longitudinally rearward through the plunger rod conduit and into the piston chamber so that the piston continuously urges the plunger in the forward longitudinal direction or (b) extends longitudinally rearward through a portion of the plunger rod conduit so that the plunger is continuously urged in the forward longitudinal direction by a piston shaft which extends forwardly from the piston into a rearward longitudinal end of the plunger rod conduit.

In step (b) of the method, the stinger bolt or screw is preferably replaced with the live load stinger apparatus by threadedly receiving the plunger rod conduit in the rearward end of the injection fitting with the plunger head positioned for longitudinal movement in the, injection fitting in a space within the injection fitting between a forward longitudinal end of the plunger rod conduit and the internal check valve.

Further aspects, features, and advantages of the present invention will be apparent to those in the art upon examining the accompanying drawings and upon reading the following Detailed Description of the Preferred Embodiments.

DETAILED DESCRIPTION OF THE PREFERRED EMBODIMENTS

An embodiment 2 of the inventive live load stinger apparatus for automatically delivering an injectable packing material or grease into a valve stem packing chamber is shown in FIGS. 1-4. The inventive live load stinger 2 preferably comprises: a body 4; a piston structure 6; one or more biasing elements 8; a plunger 10; and an end covering 12.

Figure 1:
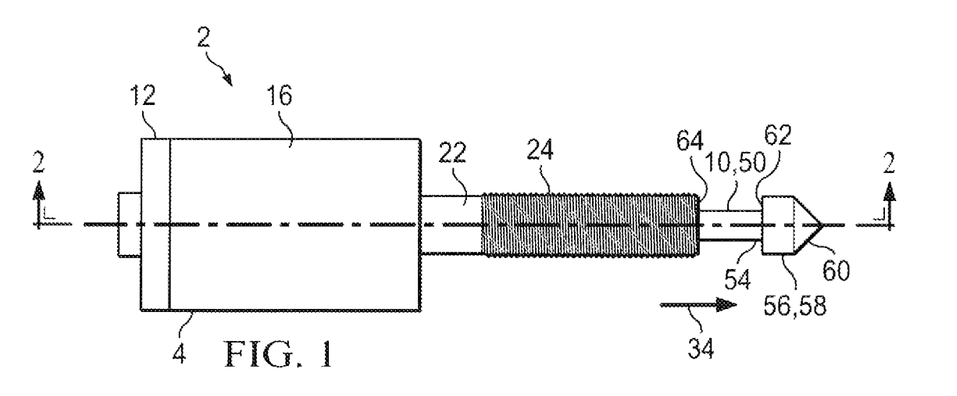
FIG. 1 is an elevational side view of an embodiment 2 of the live load stinger apparatus provided by the present invention.
Figure 2:
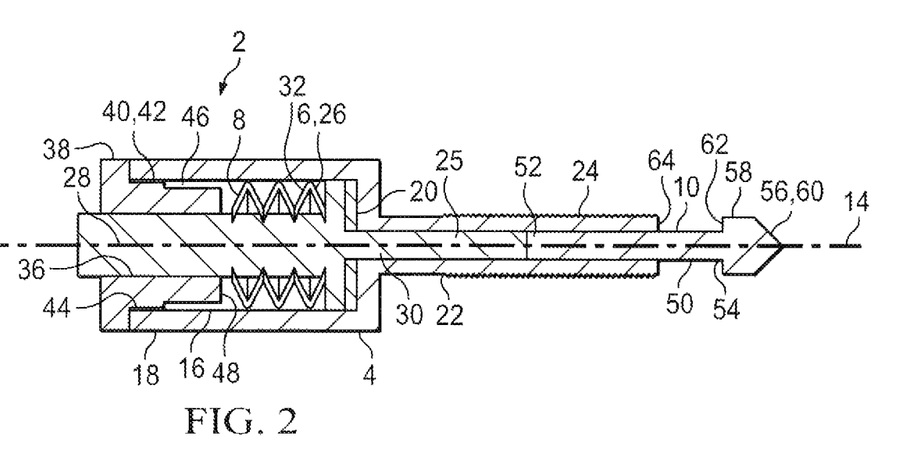
FIG. 2 is a cutaway elevational side view of the inventive live load stinger apparatus 2 as seen from perspective 2-2 shown in FIG. 1.

The body 4 of the inventive live load stinger 2 preferably comprises: a longitudinal axis 14; a longitudinally extending piston chamber 16 having a rearward longitudinal end 18 and a forward longitudinal end 20; a longitudinally extending plunger rod conduit 22 which extends forwardly from the forward longitudinal end 20 of piston chamber 16; and external threads 24 which are formed around the exterior of the plunger rod conduit 22. The plunger rod conduit 22 will preferably be cylindrical in shape. The piston chamber 16 will preferably also be cylindrical but can alternatively have a square, oval, or other non-circular cross-sectional shape.

The piston structure 6 preferably comprises: a piston 26 which is positioned for longitudinal reciprocating movement in the piston chamber 16; a longitudinally extending rearward piston shaft 28 which extends rearwardly from the piston 26, and which also slideably extends trough the end covering 12; and a longitudinally extending forward piston shaft 25 which extends forwardly from the piston 26 into the rearward longitudinal end 30 of the plunger rod conduit 22. The piston 26 has a rearward face 32 and can be in the form of radial plate, a block having a circular or other cross-sectional shape, a cylinder having a closed rearward end, or any other form desired.

The one or more biasing elements 8 are preferably positioned in the piston chamber 16 and can generally be any type of biasing element(s) capable of continuously urging the piston 26 forward longitudinal direction 34, such as, e.g.

by direct contact with the rearward face 32 of the piston 26 or by contact with one or more longitudinally moveable structure or elements positioned in the piston chamber 16 between the one or more biasing elements 8 and the rearward face 32 of the piston 26. Examples of suitable biasing elements 8 include, but are not limited to, one or more Belleville springs, one or more coil springs, or a combination thereof. The one or more biasing elements 8 will preferably be positioned around the rearward piston shaft 28 of the piston structure 6. Alternatively, or in addition, compressed air or other compressed gas could be used in the piston chamber 16 to continuously urge the piston 26 in a forward longitudinal direction 34.

The end covering 12 is positioned on the rearward end of the body 4 to close the rearward longitudinal end 18 of the piston chamber 16. The end covering 12 can be a cap, a plug, or any other type of covering capable of closing, preferably removably closing, the rearward end of the piston chamber 16. In the case of a cylindrical piston chamber 16, the end covering 12 is preferably a threaded cap comprising: a longitudinal passageway 36 extending through the cap 12 for slideably receiving the rearward piston shaft 28 of the piston structure 6; a rearward flange structure 38 having an outer diameter which is substantially the same as the outer diameter of the piston chamber 16; a cylindrical intermediate section 40 which extends forwardly from, and has a smaller diameter than, the rearward flange structure 38; external threads 42 formed around the cylindrical intermediate section 40 which threadedly mate with internal threads 44 formed in the rearward end portion of the piston chamber 16; a cylindrical forward section 46 which extends forwardly from, and has a smaller diameter than, the intermediate section 40; and a forward end 48 of the forward section 46 which directly (e.g., by direct contact with the one or more biasing elements 8) or indirectly (e.g., by contact with a structure or element positioned between the cap 12 and the one or more biasing elements 8) restricts the rearward longitudinal movement of the one or more biasing elements 8.

The plunger 10 of the inventive live load stinger apparatus 2 preferably comprises: (i) a longitudinally extending plunger rod 50 having a rearward longitudinal end 52 and forward longitudinal end 54 and (ii) a plunger head 56 on the forward end 54 of the plunger rod 50. The plunger head 56 preferably comprises (a) a rearward cylindrical portion 58 which extends forwardly from the forward end 54 of the plunger rod 50 and (b) a conical portion 60 which extends forwardly from the rearward cylindrical portion 58.

The plunger rod 50 slideably extends longitudinally rearward through at least a forward segment of the plunger rod conduit 22 of the body 4. The rearward cylindrical section 58 of the plunger head 56 includes a rearward radial shoulder 62 having a diameter which is greater than the internal diameter of the plunger rod conduit 22 such that the rearward radial shoulder 62 will contact the forward end 64 of the plunger rod conduit 22 to thereby (i) prevent the plunger head 56 from entering the forward end 64 of the plunger rod conduit 22 and (ii) limit the rearward movement of the plunger rod 50 into the plunger rod conduit 22. Consequently, the plunger head 56 is positioned for longitudinal movement outside of the forward longitudinal end 64 of the plunger rod conduit 22.

The forward piston shaft 25, which extends from the piston 26 into rearward end 30 of the plunger rod conduit 22, and which is continuously urged in the forward longitudinal direction 34 by the one or more biasing elements 8 acting directly or indirectly on the piston 26, also continuously urges the plunger 10 in the forward longitudinal direction 34. The forward piston shaft 25 preferably acts to continuously urge the plunger 10 in the forward longitudinal direction 34 by either (a) directly contacting the rearward end 52 of the plunger rod 50 or (b) contacting and pushing against one or more elements or structures slideably positioned in the plunger rod conduit 22 between the forward piston shaft 25 and the plunger rod 50.

Alternatively, the piston structure 6 and the plunger 10 can be configured such that (a) the piston structure 6 does not include a forward piston shaft 25 which extends into the rearward longitudinal end 30 of the plunger rod conduit 22 but (b) the length of the plunger rod 50 is increased such that the plunger rod 50 extends rearwardly through the plunger rod conduit 22 and into the piston chamber 16. In this embodiment, the piston 26 continuously urges the plunger 10 in the forward longitudinal direction 34 as a result, for example, of (i) the piston 26 directly contacting the rearward end 52 of the plunger rod 50, (ii) the rearward end 52 of the plunger rod 50 being connected to the piston 26, or (iii) the piston contacting and pushing against one or more elements or structures slideably positioned in the piston chamber 16 between the piston 26 and the rearward end 52 of the plunger rod 50.

The inventive live load stinger apparatus 2 preferably also comprises a visual indicator 66 which indicates when a refill of the injectable packing material or grease is needed. The visual indicator 66 preferably comprises (a) a first longitudinally extending, color segment 68 (e.g., a green segment) provided on a rearward portion 70 of the rearward piston shaft 28 and (b) a second longitudinally extending color segment 72 of a different color (e.g., a red color segment) which extends rearwardly from the first color segment 68 on the rearward portion 70 of the rearward piston shaft 28.

The first color segment 68 of the visual indicator 66 will extend from the end covering 12 on the piston chamber 16 after the stem packing chamber of the valve has been freshly filled. Subsequently, as the injectable packing material or grease in the stem packing system is depleted and the one or more biasing elements 8 operate to move the plunger 10 forwardly as needed to maintain an adequate amount and pressure of the packing material or grease in the stem packing chamber, the first color segment 68 will be simultaneously withdrawn into the end covering 12 of the piston chamber 16. The first and second color segments 68 and 72 are longitudinally positioned and sized such that, when the first color segment 68 is completely withdrawn into the end covering 12 so that only the second color segment 72 is visible, the operator will understand that the injectable packing material or grease in the valve stem packing system has been depleted to the point that a refill is advised in order to prevent a valve stem leak from occurring.

Figure 3:
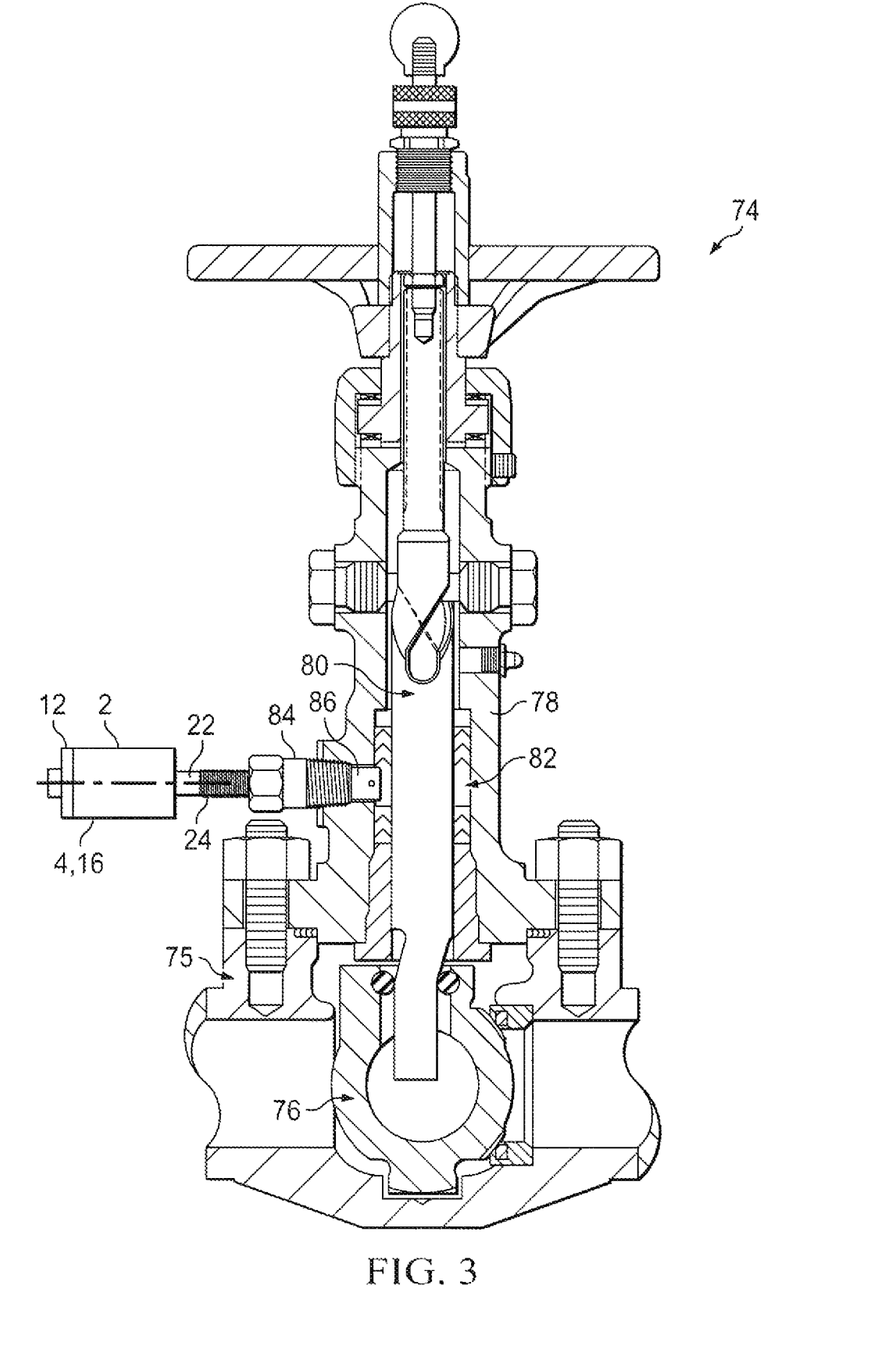
FIG. 3 is a partially cutaway elevational view of an embodiment 74 of the valve assembly provided by the present invention.
Figure 4:
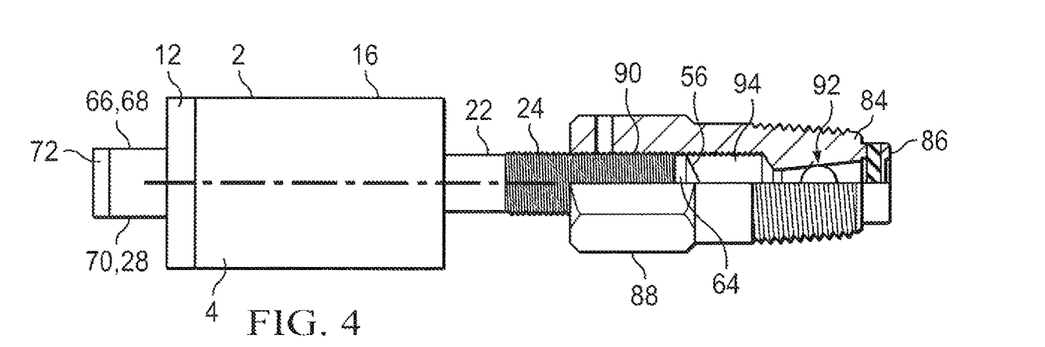
FIG. 4 is a partially cutaway elevational side view of the inventive live load stinger apparatus 2 threadedly received in a packing or grease injection fitting 84.

A valve assembly 74 having the inventive live load stinger apparatus 2 incorporated therein, or added thereto as a retrofit, is illustrated in FIGS. 3 and 4. The valve assembly 74 preferably comprises: a valve body 75 having a ball, gate, or other valve element 76 positioned therein; a bonnet 78 which removably covers the valve body 75; a valve steer 80 which extends through the bonnet 78 to the valve element 76; a stem packing chamber 82 (also commonly referred to as a stuffing box) which is positioned in the bonnet 78 around the valve stem 80; and an injection fitting 84.

The injection fitting 84 can be generally any type of fitting known in the art which is used for injecting or otherwise delivering an injectable packing material or grease into a stem packing chamber. The injection fitting 84 will preferably comprise: (i) a forward discharge end 86 which is in fluid communication with the stem packing chamber 82; (ii) a rearward end portion 88 having internal threads 90 therein; and (iii) an internal ball check valve or other check valve 92 located in the injection fitting 84 between the internal threaded portion 90 and the forward discharge end 86.

As illustrated in FIG. 4, the plunger rod conduit 22 of the inventive live load stinger 2 is threadedly received in the rearward end portion 88 of the injection fitting 84 such that the plunger head 56 is positioned for longitudinal movement in an internal space 94 within the injection fitting 84 between the forward longitudinal end 64 of the plunger rod conduit 22 and the internal check valve 92.

When the stem packing chamber 82 is freshly filled with the injectable packing material or grease, the plunger head 56 will be in a fully retracted position in the internal space 94 of the injection fitting 84 against the forward end 64 of the plunger rod conduit 22. The injectable packing material or grease will fill both the stem packing chamber 82 and the portion of the internal space 94 of the injection fitting 84 between the plunger head 56 and the internal check valve 92. As the injectable packing material or grease in the stem packing chamber 82 is worn or depleted, the one or more biasing elements 8 of the live load stinger apparatus 2 will continuously impart an amount of force to the piston 26 and the plunger 10 which adds the packing material or grease to the stem packing chamber 82 as needed and maintains a pressure of the injectable packing material or grease in the valve stem packing chamber 82 which is within a predetermined acceptable operating range.

The lower limit of the acceptable operating pressure range for the valve stem packing chamber 82 will be a pressure at which a sufficient amount of the packing material or grease is continuously maintained in the valve stem packing chamber 82 to prevent a stem leak from occurring. The upper limit of the acceptable operating pressure range will be a pressure which will not overpack the valve stem packing chamber 82 with the injectable packing material or grease.

In the method of the present invention, the inventive live load stinger apparatus 2 can be provided as an original component of a new valve assembly 74, or can be added to an existing valve assembly as a retrofit. When retrofitting an existing valve assembly, the existing valve assembly will typically be the same as the valve assembly 74 described above except that, rather than including an inventive live load stinger apparatus 2, the existing valve assembly will have a manual stinger bolt or screw which is threadedly received in the rearward end portion 88 of the injection fitting 84.

In the method of present invention when beginning with an existing valve assembly having a manual stinger bolt or screw, the existing valve is first retrofitted to form an inventive valve assembly 74 as illustrated in FIG. 3 by (a) removing the stinger bolt or screw from the injection fitting 84 and then (b) replacing the stinger bolt or screw with an inventive live load stinger apparatus 2. Prior tit step (b), the stem packing chamber 82 can be refilled with the injectable packing material or grease if needed.

In step (b) of the inventive retrofitting procedure, the manual stinger bolt or screw of the existing valve is preferably replaced with the live load stinger apparatus 2 by threadedly receiving the plunger rod conduit 22 in the rearward end 88 of the injection fitting 84 with the plunger head 56 positioned for longitudinal movement in the injection fitting 84 in the internal space 94 within the injection fitting 84 between the forward longitudinal end 64 of the plunger rod conduit 22 and the internal check valve 92. Because of the check salve 92 in the injection fitting 84 which presents backflow from the stem packing chamber 82, steps (a) and (b) of the retrofitting procedure can each be performed while the valve assembly remains in operation.

When beginning with a new valve assembly 74, or after a retrofitting procedure for an existing valve has been competed, both the stem packing chamber 82 and the portion of the internal space 94 of the injection fitting 84 between the plunger head 56 and the internal check valve 92 will be filled with the injectable packing material or grease. As the injectable packing material or grease in the stem packing chamber 82 is worn or depleted, the one or more biasing elements 8 of the live load stinger apparatus 2 will continuously impart an amount of force to the piston 26 and the plunger 10 to add packing material or grease from the internal space 94 of the injection fitting 84 to the stem packing chamber 82, as needed, to maintain a pressure of the injectable packing material or grease in the valve stem packing chamber 82 which is within the predetermined acceptable operating range. Simultaneously, as the inventive live load stinger apparatus 2 operates to automatically inject the injectable packing material or grease through the check valve 92 and into the valve stem packing chamber 82, the first color segment 68 of the visual indicator will withdraw from view into the end covering 12 of the piston chamber 16.

Eventually, when only the second color segment 72 of the indicator 66 is visible, thus indicating that a refill of the injectable packing material or grease is needed, the inventive method will preferably further comprise the steps of; (1) removing the plunger rod conduit 22 and the plunger 10 of the live load stinger apparatus 2 from the injection fitting 84; (2) connecting an injection apparatus for the injectable packing material or grease to the injection fitting 84; (3) injecting a fresh amount of the injectable packing material or grease into the injection fitting 84, through the internal check valve 92 of the injection fitting 84, and into the stem packing chamber 82; (4) disconnecting the injection apparatus; and (5) reinstalling the live load stinger apparatus 2 by threadedly receiving the plunger rod conduit 22 in the rearward end 88 of the injection fitting 84 with the plunger head 56 positioned for longitudinal movement in the injection fitting 84 in the internal space 94 within the injection fitting 84 between the forward longitudinal end 64 of the plunger rod conduit 22 and the internal check valve 92. Each of these steps 1-5 will preferably be performed while the inventive valve assembly 74 remains in operation.

Alternatively, after removing the plunger rod conduit 22 and the plunger 10 of the live load stinger apparatus 2 from the injection fitting 84, steps 2-4 can be replaced by manually placing a piece, typically a rolled-up piece, of fresh packing material into the injection fitting 84 and then reinstalling and tightening the live load stinger apparatus 2 in the injection fitting 84.

Thus, the present, invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A method of retrofitting a valve assembly having a valve stem, a stem packing chamber which surrounds the valve stem, and an injection fitting having a forward discharge end, an internal check valve, and a stinger bolt or screw which is threadedly received in a rearward end of the injection fitting, the method comprising the steps of:

(a) removing the stinger bolt or screw from the injection fitting and
(b) replacing the stinger bolt or screw with a live load stinger apparatus which comprises
a body which comprises (i) a longitudinal axis, (ii) a longitudinally extending piston chamber which surrounds the longitudinal axis, (iii) a plunger rod conduit which extends longitudinally forward from a forward longitudinal end of the piston chamber, and (iv) external threads provided around the plunger rod conduit,
a piston which is positioned in the piston chamber,
one or more biasing elements, compressed air and/or a compressed gas in the piston camber which continuously urge the piston in a forward longitudinal direction,
a plunger comprising a plunger head which is provided on a forward longitudinal end of a plunger rod, and
the plunger rod either (a) extending longitudinally rearward through the plunger rod conduit and into the piston chamber so that the piston continuously urges the plunger in the forward longitudinal direction (b) extending longitudinally rearward through a portion of the plunger rod conduit so that the plunger is continuously urged in the forward longitudinal direction by a forward piston shaft which extends forwardly from the piston into a rearward longitudinal end of the plunge rod conduit,
the stinger bolt or screw being replaced with the live load stinger apparatus in step (b) by threadedly receiving the plunger rod conduit in the rearward end of the injection fitting with the plunger head positioned for longitudinal movement in the injection fitting in a space within the infection fitting between a forward longitudinal end of the plunger rod conduit and the internal check valve.

2. The method of claim 1 further comprising steps (a) and (b) being performed while the valve assembly is in operation.

3. The method of claim 1 further comprising:
an injectable packing material or grease being present (i) in the stem packing chamber and (ii) between the plunger head and the internal check valve in the space within the injection fitting and
the one or more biasing elements, the compressed air, and/or the gas of the live load stinger apparatus imparting an amount of force to the piston which maintains a pressure of the injectable packing material or grease in the valve stem packing chamber within a predetermined acceptable operating range.

4. The method of claim 1 further comprising:
an injectable packing material or grease being present (i) in the stem packing chamber and (ii) between the plunger head and the internal check valve in the space within the injection fitting and
the method further comprises the steps, when a refill of the injectable packing material or grease is need, of
removing the plunger rod conduit and the plunger of the live load stinger apparatus from the injection fitting,
delivering a fresh amount of the injectable packing material or grease through the internal check valve of the injection fitting and into the stem packing chamber, and
after or during tile step of delivering, reinstalling the live load stinger apparatus by threadedly receiving the plunger rod conduit in the rearward end of the injection fitting with the plunger head positioned for longitudinal movement in the injection fitting in the space within the injection fitting between the forward longitudinal end of the plunger rod conduit and the internal check valve.

5. method of claim 4 comprising said steps of removing the plunger rod conduit and the plunger, delivering a fresh amount of the injectable packing material or grease, and reinstalling the live load stinger apparatus being performed while the valve assembly is in operation.

6. A method of retrofitting a valve assembly having a valve stem, a stem packing chamber which surrounds the valve stem, and an infection fitting having a forward discharge end, an internal check valve, and a stinger bolt or screw which is threadedly received in a rearward end of the injection fitting, the method comprising the steps of:
(a) removing the stinger bolt or screw from the injection fitting and
(b) replacing the stinger bolt or screw with a live load stinger apparatus which comprises
a body which comprises (i) a longitudinal axis, (ii) a longitudinally extending piston chamber which surrounds the longitudinal axis, (iii) a plunger rod conduit which extends longitudinally forward from a forward longitudinal end of the piston chamber, and (iv) external threads provided around the plunger rod conduit,
a piston which is positioned in the piston chamber,
one or more biasing elements, compressed air, and/or a compressed gas in the piston chamber which continuously urge the piston in a forward longitudinal direction,
a plunger comprising a plunger head which is provide on a forward longitudinal end of a plunger rod,
the plunger rod either (a) extending longitudinally rearward through the plunger rod conduit and into the piston chamber so that the piston continuously urges the plunger in the forward longitudinal direction or (b) extending longitudinally rearward through a portion of the plunger rod conduit so that the plunger is continuously urged in the forward longitudinal direction by a forward piston shaft which extends forwardly from the piston into a rear longitudinal end of the plunger rod conduit,
the stinger bolt or screw being replaced with the live load stinger apparatus in step (2) by threadedly receiving the plunger rod conduit in the rearward end of the injection fitting with the plunger head positioned for longitudinal movement in the injection fitting in a space within the injection fitting between a forward longitudinal end of the plunger rod conduit and the internal check valve,
the live load stinger apparatus also comprising
a cap or other covering on a rearward longitudinal end of the piston chamber,
a rearward piston shaft which extends longitudinally rearward from the piston through the cap or covering, and
an indicator on a rearward portion of the rearward piston shaft which provides a visible indication outside of the cap or other covering when a refill of an injectable packing material or grease is needed and
the method for further comprises the steps, when the indicator indicates that a refill of the injectable packing material or grease is need, of
removing the plungers rod conduit and the plunger of the live load stinger apparatus from the injection fitting.

delivering a fresh amount of the injectable packing material or grease through the internal check valve of the injection fitting and into the stem packing chamber, and after or during the step of delivering, reinstalling the live load stinger apparatus by threadedly receiving the plunger rod conduit in the rearward end of the injection fitting with the plunger head positioned for longitudinal movement in the injection fitting in the space within the injection fitting between the forward longitudinal end of the plunger rod conduit and the internal check valve.

7. A valve assembly comprising:

a valve stem;

a stem packing chamber which surrounds the valve stem;

an injection fitting having (i) a forward discharge end which is in fluid communication with the stem packing chamber, (ii) a rearward end, and (iii) an internal check valve located between the rearward end and the forward discharge end of the injection fitting;

a live load stinger apparatus which comprises a body which comprises (i) a longitudinal axis, (ii) a longitudinally extending piston chamber which surrounds the longitudinal axis, (iii) a plunger rod conduit which extends longitudinally forward from a forward longitudinal end of the piston chamber, and (iv) external threads provided around the plunger rod conduit, the plunger rod conduit being threadedly received in the rearward end of the injection fitting, a piston which is positioned in the piston chamber;

one or more biasing elements, compressed air, a flor a compressed gas in the piston chamber which continuously urge the piston in a forward longitudinal direction, a plunger comprising a plunger head which is provided on a forward longitudinal end of a plunger rod, the plunger head being positioned for longitudinal movement in the injection fitting in a space within the injection fitting between a forward longitudinal end of the plunger rod conduit and the internal check valve, and the plunger rod either (a) extending longitudinally rearward through the plunger rod conduit and into the piston chamber so that the piston continuously urges the plunger in the forward longitudinal direction or (b) extending longitudinally rearward through a portion of the plunger rod conduit so that the plunger is continuously urged in the for forward longitudinal direction by a forward piston shaft which extends forwardly from the piston into a rearward longitudinal end of the plunger rod conduit; and an injectable packing material or grease which is provided in the stem packing chamber and is provided between the plunger head and the internal check valve in the space Within the injection fitting.

8. The valve assembly of claim 7 further comprising:

the live load stinger apparatus also comprising a rearward piston shaft which longitudinally extends rearwardly from the piston;

the live load stinger apparatus comprising the one or more biasing elements in the piston chamber; and the one or more biasing elements in the piston chamber being positioned around the rearward piston shaft.

9. The valve assembly of claim 7 further comprising the live load Stinger apparatus also comprising a cap or other covering on a rearward longitudinal end of the piston chamber;

a rearward piston shaft which longitudinally extends rearwardly from the piston through the cap or covering; and an indicator on a rearward piston of the rearward piston shaft which provides a visible indication outside of the cap or other covering when a refill of the injectable packing material or grease in the stem packing chamber and/or between the plunger head and the internal check valve in the space within the injection fitting is needed.

10. The valve assembly of claim 9 further comprising the live load stinger apparatus also comprising the indicator comprising a first color segment on the rearward portion of the rearward piston shaft and a second color segment on the rearward portion of the rearward piston shaft which extends rearwardly from and has a color which is different from the first color segment.

11. The valve assembly of claim 7 further comprising the live load stinger apparatus also comprising the plunger head having a rearward cylindrical portion and a conical portion winch extends forwardly from the rearward cylindrical portion.

12. The valve assembly of claim 7 further comprising the live load stinger apparatus comprising the one or more biasing elements in the piston chamber and the one or more biasing elements comprising one or more Belleville springs and/or one or more coil springs.

13. The valve assemble of claim 7 further comprising the one or more biasing elements, the compressed air, and/or the compressed gas in the piston chamber of the live load stinger apparatus imparting an amount of force to the piston which maintains a pressure of the injectable packing material or grease in the valve stem packing chamber within a predetermined acceptable operating range.

14. The vale assembly of claim 8 comprising (i) the live load stinger apparatus comprising the forward piston shaft which extends forwardly from the piston into the rearward longitudinal end of the plunger rod conduit and (ii) the plunger rod extending longitudinally rearward through the portion of the plunger rod conduit so that the plunger rod is continuously urged in the forward longitudinal direction by, but is not connected to, the forward piston shaft.

* * * * *

UNITED STATES PATENT AND TRADEMARK OFFICE
CERTIFICATE OF CORRECTION

PATENT NO. : 11,519,522 B1
APPLICATION NO. : 17/375502
DATED : December 6, 2022
INVENTOR(S) : Brian M. Dunn It is certified that error appears in the above-identified patent and that said Letters Patent is hereby corrected as shown below:

In the Claims

Claim 1, Column 9, Line 23: Insert --or-- between "tion" and "(b)"

Claim 4, Column 9, Line 64: Change "tile" to "the"

Claim 5, Column 10, Line 4: Add "The" in front of "method"

Claim 6, Column 10, Line 11: Change "infection" to "injection"

Claim 6, Column 10, Line 31: Change "provide" to "provided"

Claim 6, Column 10, Line 41: Change "rear" to "rearward"

Claim 6, Column 10, Line 44: Change "(2)" to "(b)"

Claim 7, Column 11, Line 31: Change "a flor" to "and/or"

Claim 7, Column 11, Line 56: Change "Within" to "within"

Claim 9, Column 12, Line 10: Change "Stinger" to "stinger"

Claim 9, Column 12, Line 16: Change "piston of" to "portion of"

Claim 11, Column 12, Line 33: Change "winch" to "which"

Claim 14, Column 12, Line 47: Change "vale" to "valve"

Claim 14, Column 12, Line 47: Change "8" to "7"

Signed and Sealed this
Seventh Day of March, 2023

*Katherine Kelly Vidal*

Katherine Kelly Vidal
*Director of the United States Patent and Trademark Office*